Patented Nov. 19, 1929

1,736,747

UNITED STATES PATENT OFFICE

HAROLD A. MORTON, OF AKRON, OHIO

PROTECTION OF ALDEHYDES FROM OXIDATION AND AGENTS THEREFOR

No Drawing.        Application filed July 14, 1928. Serial No. 292,909.

Considerable difficulty is experienced in the storage and handling of various aldehydes due to oxidation to the corresponding acids. This oxidation results in the contamination of the aldehyde with undersirable acids; in the destructive action of the acid on the containers; and in the discoloration of the product and accumulation of impurities due to the corrosive action of the acid on the metal container.

My invention relates to the retardation or prevention of the oxidation of aldehydes by the addition of a material possessing anti-oxidant properties.

According to my invention, the aldehyde or aldehyde solution to be preserved has as an added ingredient a small quantity of 1-2 diamino ethane or a derivative thereof.

There are a number of such amino derivatives of ethane which function in this manner and they may be represented by the following general chemical constitution:

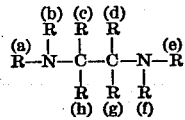

In the above representation of the constitutional formula the chemical radicals attached to the nitrogen atoms are denoted by symbols: R(a), R(b), R(e), and R(f); the radicals attached to the carbon atoms are represented by R(c), R(d), R(g), and R(h).

R(a), R(b), R(e) and R(f) may be any of the following chemical groups or their equivalents:

H, $CH_3$, $CH_3CH_2$, $CH_3CH_2CH_2$, $(CH_3)_2CH$, $CH_3CH_2CH_2CH_2$, $(CH_3)_2CH \cdot CH_2$, $CH_3CH_2CH_2CH_2CH_2$, $(CH_3)_2CH.CH_2CH_2$, $C_6H_5$, $C_6H_4.CH_3$, $C_6H_3(CH_3)_2$, $C_6H_5CH_2$, $C_6H_4NH_2$, $C_6H_3(CH_3)NH_2$, $C_6H_4OH$, $C_{10}H_7$.

R(a), R(b), R(e) and R(f) may also be any of the following chemical groups or their equivalents: NO, $C_6H_3(CH_3)NO_2$, $C_6H_4NO_2$, $C_6H_4Cl$; but in the case of these more negative groups, not more than two should be used in each molecule.

R(c), R(d), R(g) and R(h) may be any of the following chemical radicals:

H, $CH_3$, $CH_3CH_2$, $CH_3CH_2CH_2$, $(CH_3)_2CH$, $CH_3CH_2CH_2CH_2$, $(CH_3)_2CH.CH_2$, $CH_3CH_2CH_2CH_2CH_2$, $(CH_3)_2CH.CH_2CH_2$, $C_6H_5$, $C_6H_4CH_3$, $C_6H_3(CH_3)_2$, $C_{10}H_7$, $C_6H_5CH_2$.

In this specification all the materials referred to are nitrogen derivatives of ethane. In general they may be prepared by heating the dihalogen derivative of ethane (or substituted ethanes) with the appropriate amino compound, although other methods of preparation may be employed.

By the term derivative, as used in this specification and claims, it is not intended to include molecular constitutions containing several strongly negative groups as pointed out above, nor do I intend to include molecular constitutions containing still more highly negative groups such as $C_6H_5CO$, $C_6H_3(NO_2)_2$, $CH_3C_6H(NO_2)_3$, etc.

The nomenclature used to denote the position of the substituted chemical groups is the conventional system, the structure of the ethane molecule being considered to be as follows:

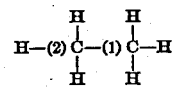

As examples of compounds of this class which have been found to have anti-oxidant properties, I may mention the following:

1-2 di amino ethane
1-2 di amino 2-methyl ethane
1-2 di amino 2-ethyl ethane
1-2 di amino 1-2 dimethyl ethane
1-2 di (para tolyl amino) ethane
1-2 di (phenyl amino) ethane
1-2 di (ortho tolyl amino) ethane
1-2 di (xylyl amino) ethane
1-2 di (alpha naphthyl amino) ethane
1-2 di (beta naphthyl amino) ethane
1   (phenyl amino) 2-(ortho tolyl amino) ethane
1   (phenyl amino) 2-(para tolyl amino) ethane
1   (phenyl amino) 2-(alpha naphthyl amino) ethane
1   (para tolyl amino) 2-(alpha naphthyl amino) ethane
1-2 di (ethyl ortho tolyl amino) ethane
1-2 di (benzyl phenyl amino) ethane
1-2 di (phenyl nitros amino) ethane
1-2 di (ethyl phenyl amino) ethane 1-2 di (benzyl amino) ethane
1-2 di (butyl phenyl amino) ethane
1-2 di (phenyl amino) 2-methyl ethane
1-2 di (ortho tolyl amino) 2-methyl ethane
1-2 di (para tolyl amino) 2-methyl ethane
1-2 di (xylyl amino) 2-methyl ethane
1-2 di (alpha naphthyl amino) 2-methyl ethane
1-2 di (beta naphthyl amino) 2-methyl ethane
1-2 (phenyl xylyl diamino) 2-methyl ethane
1-2 di (ethyl phenyl amino) 2-methyl ethane
1-2 (phenyl ortho tolyl diamino) 2-methyl ethane
1-2 di (phenyl nitros amino) 2-methyl ethane
1-2 (phenyl alpha naphthyl diamino) 2-methyl ethane
1-2 di (phenyl amino) 2-isopropyl ethane
1-2 di (phenyl amino) 2-pseudo butyl ethane
1-2 di (ethyl ortho tolyl amino) 2-methyl ethane
1-2 di (phenyl amino) 2-methyl ethane
1 2 di (phenyl amino) 1-2-dimethyl ethane
1-2 di (ortho tolyl amino) 1-2-dimethyl ethane
1-2 di (para tolyl amino) 1-2-dimethyl ethane
1-2 di (alpha naphthyl amino) 1-2-dimethyl ethane
1-2 di (ortho tolyl amino) 2-ethyl ethane
1-2 di (phenyl amino) 2-2-dimethyl ethane
1-2 di (phenyl amino) 1-methyl 2-ethyl ethane
1-2 di (phenyl amino) 1-2-diphenyl ethane
1-2 di (phenyl amino) 1-2-2-trimethyl ethane
1-2 di (ortho tolyl amino) 1-2-2-trimethyl ethane
1-2 di (alpha naphthyl amino) 1-2-2-trimethyl ethane
1-2 di (phenyl amino) 1-1-2-2-tetra-methyl ethane
1-2 di (ortho tolyl amino) 1-1-2-2-tetra-methyl ethane
1-2 di (alpha naphthyl amino) 1-1-2-2-tetra-methyl ethane The above examples are of value in practicing this invention and serve to indicate the wide range of materials of this type which are of value in preventing the oxidation of aldehydes. However, they are given only as typical examples and this invention is not limited to these specific compounds.

For example, it is not only possible to use the free bases of the above series but the salts and soaps formed from these materials also exhibit substantially the same effect, the anti-oxidant properties apparently being in the diamino ethane portion of the radical.

The amount of the material which is used may vary greatly, but quantities ranging from 0.25% to 1.0% have been found to produce good results. Of course a smaller amount of material may be used if the preserving action need not be so great and correspondingly the quantity may be increased considerably above 1.0% if it seems desirable.

In general the compounds of this invention are easily prepared and some member of the group is soluble in each of the common aldehydes. The activity of these materials is not destroyed by relatively high temperatures. In general these compounds impart no undesirable characteristics to the aldehydes.

The process may be used in any place where it is desirable to prevent the oxidation of aldehydes, whether this be during storage and handling or during the course of chemical reactions.

The process of this invention may also be practiced with any material which contains aldehyde groups and which has a tendency to become oxidized.

To illustrate the manner in which the foregoing materials may be used and the effect which they have on the oxidation of aldehydes the following examples are given:

Example 1

A sample of butylaldehyde contained in a small flask equipped with a reflux condenser was treated with a comparatively rapid stream of dry oxygen at atmospheric temperature. The same conditions were used in a series of other flasks containing butylaldehyde in the presence of 1-2 di (phenyl amino) ethane, ($C_6H_5NHCH_2CH_2NHC_6H_5$) and the rate of oxidation determined by analyzing the butylaldehyde at regular intervals for the amount of butyric acid formed.

The difference in oxidation was also readily noted by the relative change in temperature. The butylaldehyde containing no anti-oxidant, developed considerable heat as oxidation progressed, whereas the butylaldehyde samples in the presence of 1-2 di (phenyl amino) ethane showed no appreciable increase in temperature.

The following table shows the anti-oxidant effect of various quanties of 1-2 di (phenyl amino) ethane.

An analysis of the butylaldehyde before treatment with oxygen showed that it contained 0.8% butyric acid.

| Time Hours | Control % acid | 0.25% | 0.5% | 1.0% |
|---|---|---|---|---|
| | | 1-2 di (phenyl amino) ethane | | |
| | | % acid | % acid | % acid |
| 6 | 12.75 | 1.75 | 1.25 | 0.75 |
| 12 | 32.0 | 2.55 | 2.25 | 1.5 |
| 18 | 45.0 | 4.1 | 3.0 | 2.0 |
| 24 | 56.5 | 6.5 | 3.75 | 2.5 |
| 36 | 71.5 | 10.5 | 7.0 | 3.6 |

It is seen from the above figures that 1-2 di (phenyl amino) ethane materially retards the oxidation of butylaldehyde.

Example 2

The samples were treated with a stream of dry oxygen at ordinary temperature and the butyric acid determined at intervals, as before.

The butylaldehyde before treatment with oxygen contained 0.75% butyric acid.

| Time Hours | Control % acid | 0.5% 1-2 di (phenyl amino) 2-methyl ethane ($C_6H_5NHCH.CH_2CH_2NHC_6H_5$) % acid | 0.5% 1-2 di (para tolyl amino) ethane ($CH_3C_6H_4NHCH_2CH_2NHC_6H_4CH_3$) % acid |
|---|---|---|---|
| 8 | 20.00 | 2.5 | 4.0 |
| 16 | 33.50 | 2.5 | 5.5 |
| 24 | 47.00 | 3.0 | 9.0 |
| 32 | 62.75 | 4.0 | 13.0 |
| 40 | 68.00 | 5.75 | 14.5 |

| Time Hours | Control % acid | 0.5% (NH$_2$CH$_2$CH$_2$NH$_2$) 1-2 diamino ethane % acid | 0.5% (C$_{10}$H$_7$NHCH$_2$CH$_2$NHC$_{10}$H$_7$) 1-2 di (alpha naphthyl amino) ethane % acid |
|---|---|---|---|
| 8 | 20.00 | 5.5 | 2.5 |
| 16 | 33.50 | 7.5 | 3.0 |
| 24 | 47.00 | 13.0 | 4.7 |
| 32 | 62.75 | 17.0 | 7.75 |
| 40 | 68.00 | 21.5 | 13.5 |

*Example 3*

To illustrate the use of 1-2 di (phenyl amino) ethane for the preservation of benzaldehyde, the following example is given.

Dry oxygen was passed through the samples at ordinary temperature and the benzoic acid content was determined at regular intervals.

| Time Hours | Control % acid | 0.5% 1-2 di (phenyl amino) ethane % acid |
|---|---|---|
| 6 | 4.00 | 2.40 |
| 12 | 7.75 | 2.45 |
| 18 | 8.50 | 2.45 |
| 24 | 9.25 | 2.40 |
| 36 | 11.50 | 2.35 |
| 54 | 15.00 | 2.40 |

A blank analysis was also made on the benzaldehyde before the test and the untreated aldehyde was found to contain 2.35% of benzoic acid.

It is thus seen from the above table that 1-2 di (phenyl amino) ethane under the above conditions practically completely prevents the oxidation of benzaldehyde to benzoic acid.

*Example 4*

To show the wide range of materials of the above series which are of value in practicing this invention, the following example is given.

The rate of oxidation is not shown at regular intervals, only one test being made at the end of a six hour period of treatment with oxygen. It is to be noted that all of the members show anti-oxidant properties to varying degrees. It is thus possible for one skilled in the art to choose the proper material for the purpose at hand.

In all of the following cases 0.5% of the anti-oxidant is used.

In the present example the control, which consisted of butylaldehyde in the absence of an anti-oxidant showed an acidity of 32.5% butyric acid at the end of the six hour oxidation period.

Anti-oxidant : 1-2 di (phenyl amino) 1-2-dimethyl ethane
Chemical formula : C$_6$H$_5$NH(CH$_3$).CH.CH(CH$_3$)NHC$_6$H$_5$
Acidity : 1.7%

Anti-oxidant : 1 (phenyl amino) 2-(para tolyl amino) ethane
Chemical formula : C$_6$H$_5$NH.CH$_2$CH$_2$NHC$_6$H$_4$CH$_3$
Acidity : 1.9%

Anti-oxidant : 1-2 di (ortho tolyl amino) ethane
Chemical formula : CH$_3$C$_6$H$_4$.NH.CH$_2$CH$_2$.NHC$_6$H$_4$CH$_3$
Acidity : 2.0%

Anti-oxidant : 1-2 di (phenyl nitrosamino) ethane
Chemical formula : C$_6$H$_5$N.NOCH$_2$CH$_2$NO.NC$_6$H$_5$
Acidity : 5.4%

Anti-oxidant : 1-2 di (xylyl amino) ethane
Chemical formula : (CH$_3$)$_2$C$_6$H$_3$NHCH$_2$CH$_2$NHC$_6$H$_3$(CH$_3$)$_2$
Acidity : 0.9%

Anti-oxidant : 1 (phenyl amino) 2-(ortho tolyl amino) ethane
Chemical formula : C$_6$H$_5$NHCH$_2$CH$_2$NHC$_6$H$_4$CH$_3$
Acidity : 1.1%

Anti-oxidant : 1 (phenyl amino) 2-(alpha naphthyl amino) ethane
Chemical formula : C$_6$H$_5$NHCH$_2$CH$_2$NHC$_{10}$H$_7$
Acidity : 1.1%

Anti-oxidant : 1 (para tolyl amino) 2-(alpha naphthyl amino) ethane
Chemical formula : CH$_3$C$_6$H$_4$NHCH$_2$CH$_2$NHC$_{10}$H$_7$
Acidity : 1.7%

Anti-oxidant : 1-2 di (ethyl ortho tolyl amino) ethane
Chemical formula : CH$_3$C$_6$H$_4$NC$_2$H$_5$CH$_2$CH$_2$C$_2$H$_5$NC$_6$H$_4$CH$_3$
Acidity : 0.6%

Anti-oxidant : 1-2 di (ethyl phenyl amino) ethane
Chemical formula : C$_6$H$_5$NC$_2$H$_5$CH$_2$CH$_2$C$_2$H$_5$NC$_6$H$_5$
Acidity : 0.7%

Anti-oxidant : 1-2 di (para tolyl amino) 2-methyl ethane
Chemical formula : CH$_3$C$_6$H$_4$NH(CH$_3$)CH.CH$_2$-NHC$_6$H$_4$CH$_3$
Acidity : 1.4%

Anti-oxidant : 1-2 di (ortho tolyl amino) 2-methyl ethane
Chemical formula : CH$_3$C$_6$H$_4$NH(CH$_3$)CH.CH$_2$NHC$_6$H$_4$CH$_3$
Acidity : 1.1%

Anti-oxidant : 1-2 (phenyl xylyl diamino) 2-methyl ethane
Chemical formula : C$_6$H$_5$NH(CH$_3$)CH.CH$_2$NHC$_6$H$_3$(CH$_3$)$_2$
Acidity : 0.5%

Anti-oxidant : 1-2 di (alpha naphthyl amino) 2-methyl ethane
Chemical formula : C$_{10}$H$_7$NH-(CH$_3$)CH.CH$_2$NHC$_{10}$H$_7$
Acidity : 1.2%

The above examples are illustrative of the various methods of carrying out this invention.

What I claim is:

1. The method of retarding the oxidation of aldehydes which comprises adding to the aldehyde 1-2 diamino ethane or a derivative thereof.

2. The method of retarding the oxidation of aldehydes which comprises adding to the aldehyde a derivative of 1-2 diamino ethane, wherein one of the hydrogen atoms of each amino group is replaced by an organic radical.

3. As an agent for retarding the oxidation of an aldehyde, 1-2 diamino ethane or a derivative thereof.

4. The method of retarding the oxidation of aldehydes which comprises adding to the aldehyde a derivative of 1-2 diamino ethane, wherein one of the hydrogen atoms of each amino group is replaced by an aromatic group.

5. The method of retarding the oxidation of aldehydes which comprises adding to the aldehyde a derivative of 1-2 diamino ethane, wherein both of the hydrogen atoms of each amino group are replaced by two organic groups, one of which is an aromatic radical.

6. The method of retarding the oxidation of aldehydes which comprises adding to the aldehyde the organic base made by heating one mol of 1-2 dihalogen ethane and more than two mols of an aromatic amine.

7. The method of retarding the oxidation of aldehydes which comprises adding to the aldehyde a di-aryl substituted 1-2 diamino ethane.

8. The method of retarding the oxidation of aldehydes which comprises adding to the aldehyde a derivative of a di-aryl substituted 1-2 diamino ethane.

9. The method of retarding the oxidation of aldehydes which comprises adding to the aldehyde 1-2 di (phenyl amino) ethane.

10. A compound containing a -CHO group to which has been added 1-2 diamino ethane, or a derivative thereof.

11. The method of retarding the oxidation of aldehydes which comprises adding to the aldehyde a derivative of 1-2 diamino ethane, wherein one of the hydrogen atoms of each amino group is replaced by a phenyl group.

12. The method of retarding the oxidation of aldehydes which comprises adding to the aldehyde a derivative of 1-2 diamino ethane, wherein both of the hydrogen atoms of each amino group are replaced by two phenyl groups.

In testimony whereof I affix my signature.

HAROLD A. MORTON.